INVENTOR
Gustave Javaux
BY Spencer & Kaye
ATTORNEYS

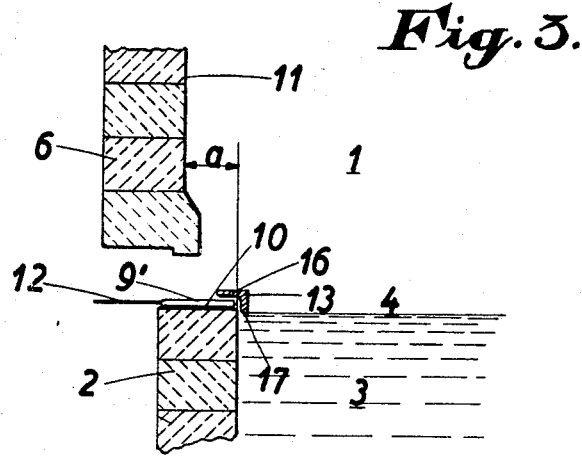
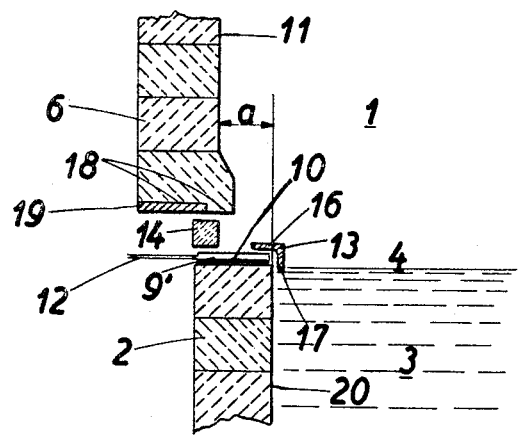

United States Patent Office 3,442,635
Patented May 6, 1969

3,442,635
GLASS FURNACE WALL ARRANGEMENT
Gustave Javaux, Brussels, Belgium, assignor to Glaverbel
S.A., Brussels, Belgium
Filed Jan. 21, 1966, Ser. No. 522,218
Claims priority, application Luxembourg, Feb. 24, 1965,
48,073
Int. Cl. C03b 5/20, 5/04
U.S. Cl. 65—168                                    7 Claims

ABSTRACT OF THE DISCLOSURE

An arrangement for protecting the upper bricks of the walls of a glass melting tank from damage due to corrosive products formed on upper furnace walls disposed above the tank and in communication with the atmosphere above the molten glass, the arrangement being formed by spacing the lower edge of the upper walls above the upper bricks of the tank so that corrosive products forming on the upper walls will undergo free fall before reaching the upper bricks, and by disposing removable collecting element on top of the upper bricks for catching the corrosive products and keeping them out of contact with the brick, the element being removed and replaced when it becomes filled.

---

The present invention relates generally to tank furnaces of the type used in the glass-making industry and more particularly to a method and apparatus for protecting the tank walls of such a furnace wherein the furnace includes in addition to the tank walls a crown and side walls located above the tank walls and slightly displaced therefrom towards the exterior of the furnace.

Each part of the furnaces used in the glass-making industry is subjected to corrosion forces which result from the operating conditions thereof, and the extent of the corrosion depends upon which of the multiplicity of possible forces acts upon an individual part and the degree to which the corrosive action causes destruction of such part. The top course of blocks of the tank walls of the furnace is particularly affected by the corrosive conditions within the furnace. That is, in addition to the inner vertical face of the tank walls being corroded by the molten glass bath, which corrosion effects are particularly noticeable at the surface level of the molten glass bath, the walls are subjected to additional destructive forces. Thus, the walls are also corroded by corrosion products running down the crown and side walls of the furnace with these corrosion products being formed from the chemical reactions occurring between the refractory materials of the furnace and particles of the molten glass which are spattered on the refractory materials. Since the temperature within the furnace is extremely high, this facilitates the acceleration of the corrosion reactions between the furnace walls and the spattering glass composition particles.

The furnace is also subjected to other corrosive forces in the form of chemical reactions which result between the refractory materials and alkaline vapors and other gas vapors which are present within the furnace. If the corrosive products resulting from the aforementioned chemical reactions are not collected, they are deposited on the top portion of the tank walls, thereby corroding the tank walls and in many cases running over the walls and into the molten glass bath whereby the bath may be contaminated.

It has been proposed to protect the upper portions of the tank walls by forming between them and the molten glass bath a small mass of solidified glass, which could be deposited on the walls by placing along the internal face of the upper portion of the wall pipes conveying a refrigerating fluid for solidifying the glass. This system, however, does not prevent the horizontal upper portions of the tank walls from being corroded by the corrosion products which run down the side walls of the furnace. In addition, the system suffers from other disadvantages in that when the pipes are to be replaced, for example, when they are clogged, the pipes can only be removed from the walls when the cooling fluid is not circulating therein. During the time there is no circulation of the fluid, the solidified or partially devitrified glass melts and mixes with the corrosion products which results in the glass bath becoming contaminated. The contamination of the glass results in defects, such as stones, striae, ream, or the like, when the contaminated glass is worked in glass processing machines.

It is therefore an object of the present invention to provide a method for decreasing the corrosion of the tank walls of a tank furnace and for decreasing the likelihood of a contaminated glass due to corrosion products within the furnace.

It is another object of the present invention to provide apparatus for collecting corrosion products formed within a tank furnace.

It is a further object of the present invention to provide apparatus for withdrawing corrosion products from the tank furnace without contaminating the molten glass bath within such furnace.

These objects and others ancillary thereto are accomplished according to preferred embodiments of the present invention wherein corrosion products formed within the tank furnace are collected as they run down the crown and side walls of the furnace into a removable structure provided on the horizontal upper face of the tank walls. The removable structure thus prevents the reaction products from directly corroding the refractory blocks at the top of the tank wall and provides an easy way of removing the collected products from the furnace without contaminating the molten glass bath contained therein.

According to a feature of the present invention, the liquid corrosion products are solidified by cooling the removable structure on which these products are deposited. Thus, the removal of such products is made easier and at the same time, the corrosion products are prevented from flowing either upon the blocks of the refractory material or into the molten glass bath. In addition thereto, the solidified products are less corrosive than when in the liquid state so that the removable structure is also subject to less corrosion.

According to a further feature of the present invention, the removable structure is in a form of a hollow metal box which is cooled by circulating a cooling fluid in one of the walls thereof and preferably the bottom one. Thus, the corrosion products are rapidly cooled as they are deposited on the coolest portion of the metal box and due to this immediate cooling the corrosion products do not adhere thereto.

Additional objects and advantages of the present invention will become apparent upon consideration of the following description when taken in conjunction with the accompanying drawings in which:

FIGURE 3 is a fragmentary cross-sectional view of a further embodiment according to the present invention.

FIGURE 4 is a fragmentary cross-sectional view of another embodiment of the present invention.

Figure 1:
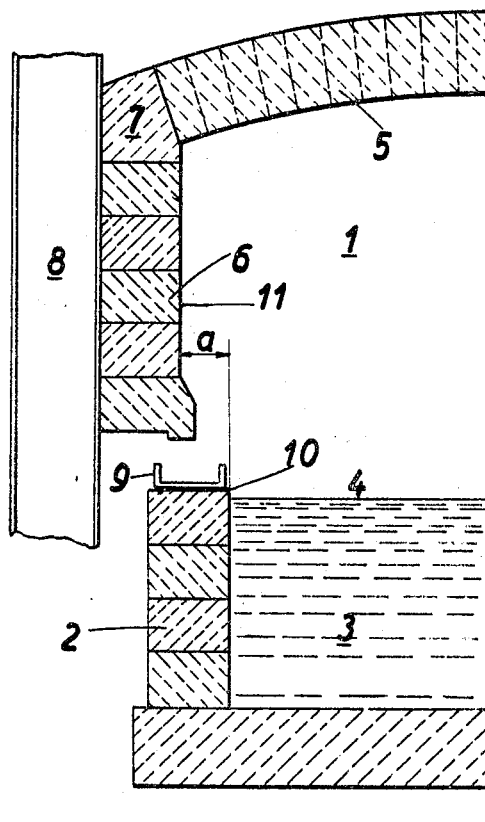
FIGURE 1 is a schematic cross-sectional view of a tank furnace according to the present invention.

Referring now to the drawings, there is shown in FIGURE 1 a tank furnace 1, as is used in the glass making industry, and having tank walls 2 for containing a molten glass bath 3 having a horizontal surface level 4. The furnace also comprises an upper zone wherein the corrosion products are formed and including a crown 5 and side walls 6, with the crown abutting a springing course of blocks 7 which adjoins a metal frame 8. The springing course 7 forms the top course of bricks for the side walls 6, which walls are slightly set back from the tank walls by a distance $a$ towards the exterior of the furnace. The blocks forming the furnace are made from a refractory material.

According to the present invention, there is provided on the upper horizontal face 10 of the tank walls 2 a collection zone including a removable metal structure 9 which is adapted to receive the corrosion products formed within the upper zone of the furnace and directed down the crown and side walls which form the upper zone. As shown, the structure 9 includes side walls and a bottom wall with the opening of the structure being positioned under the inner face 11 of the side wall 6 between the upper zone and the tank walls of the furnace.

Figure 2:
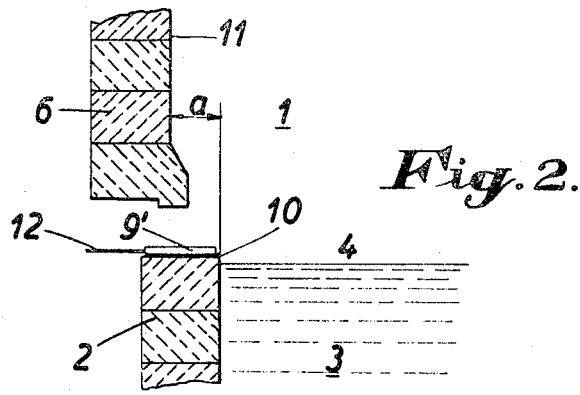
FIGURE 2 is a fragmentary cross-sectional view of another embodiment according to the present invention.

In FIGURE 2, which is a modification of the embodiment of FIGURE 1, there is shown a removable structure 9' resting upon the upper horizontal face 10 of the tank 9' resting upon the upper horizontal face 10 of the tank walls 2. As in FIGURE 1, the tank walls contain the bath of molten glass 3 having a surface level 4. The removable structure 9' is formed by a metal box cooled by means of a fluid circulated therein under pressure, and conveyed by an inlet and outlet pipes 12, only one of which is shown. As explained previously, corrosion products are formed within the furnace and as a result of the temperatures within the furnace and the molten glass bath, corrosion particles and the like are spattered on the crown and side walls of the furnace. These corrosion products run down the crown 5 and the side walls 6 and due to the arrangement shown are deposited on the removable structure 9'. Since this structure is fluid cooled, the corrosion products solidify when they come in contact with the structure and thus can easily be removed from the furnace. Also, since the corrosion products are in a solidified state, the corrosion products are prevented from flowing into the molten glass bath and hence contaminating the bath and producing defects in the formed glass.

As shown in FIGURE 3, the removable structure 9' is protected from the molten glass bath 3 by a member 13 in the shape of an angle iron. The member 13 which may be made of a refractory material is provided with a horizontally disposed flange 16 which rests on the removable structure 9' and a vertically disposed flange 17 which is placed against the inner tank wall 2 of the furnace.

In FIGURE 4, there is shown a further embodiment of the present invention wherein the removable structure 9' is provided with side walls made from a heat resistant material and which can also be removable. A block 14 made of a refractory material forms a side wall for the removable structure 9' and is placed between the top face of the removable structure and the lower face 18 of the side walls 6. It, therefore, closes the opening existing between the side walls 6 and the tank wall 2. The block 14 furthermore acts to protect a metal element 19, which supports the side walls 6, from the corrosive atmosphere of the furnace. The other side wall is formed by the member 13 with the flange 16 resting on the removable structure 9' so that the removable structure forms the base of a gutter or drain channel. The flange 17, as in FIGURE 3, rests against the vertical inner face 20 of the tank wall 2. The flange 17 thus protects the refractory materials of the tank walls from the corrosive action of the molten glass bath. The vertical flange is preferably immersed in the molten glass bath contained within the furnace and thus protects the tank wall at the surface level of the molten glass bath, at which contact surface the corrosion of the tank wall is particularly intense.

Figure 5:
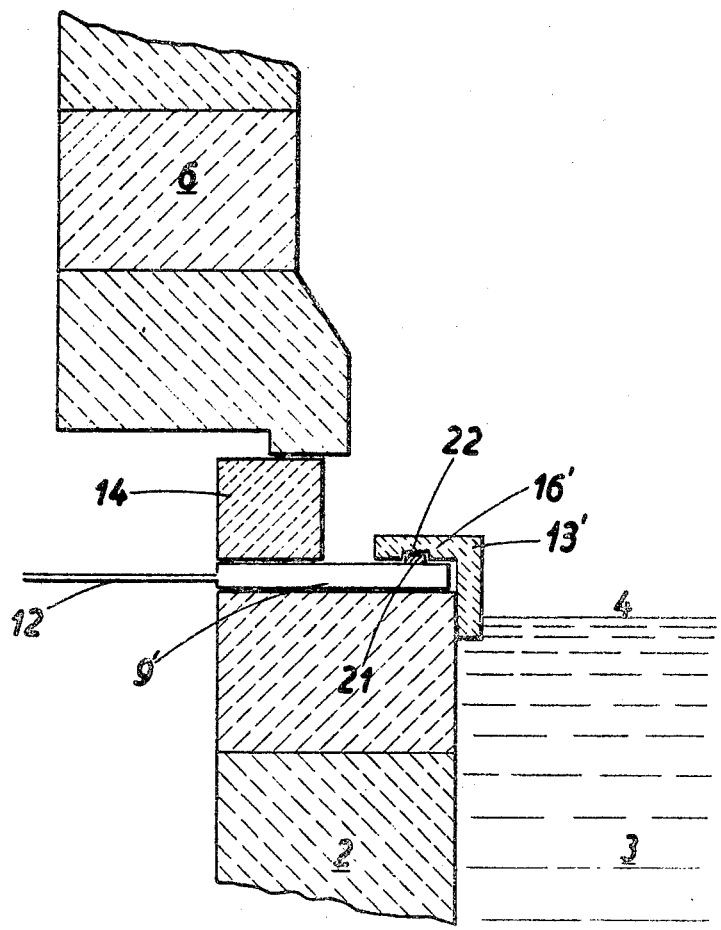
FIGURE 5 is an enlarged fragmentary cross-sectional view of a further embodiment according to the present invention.

In FIGURE 5 there is shown another embodiment of the present invention wherein the removable structure 9' is provided with a side wall 13' in the shape of an angle iron. According to this embodiment, the removable structure is provided with an upstanding rib 21 and the horizontal flange of the member 13' is provided with a channel 22 for receiving the rib 21 therein. Accordingly, the member 13' is then secured to the removable structure 9' and can only be displaced by lifting the member therefrom. It should be noted that the upstanding rib 21 and the channel 22 may be formed as integral parts of the respective members 9' and 13'.

It should also be noted that in addition to the structure 9' being removable, both members forming the side walls therefor, that is, the block 14 and the member 13' can also be removed from the furnace and are easily replaceable without shutting down the furnace. Since the inner member is in the form of an angle iron and has a very simple shape, it can be easily and rapidly obtained and is inexpensive to produce. This is an important factor in that this member is subjected to most of the corrosive forces within the furnace. The removable structure 9' and the refractory block 14 may also be replaced at a small cost when they too are corroded beyond use.

Thus according to the present invention, the upper horizontal parts of the refractory materials located above the tank walls and also the vertical inner faces of the tank walls may be protected against the action of the corrosion products. Moreover, by protecting the upper refractory blocks of the tank walls from the various corrosion forces, the present invention permits the use of blocks of refractory material at the top portion of the tank walls which are not of a higher quality, or more heat resistant and consequently more expensive to produce than the other blocks of the same walls.

It will be understood that the above description of the present invention is susceptible to various modifications, changes and adaptations, and the same are intended to be comprehended within the meaning and range of equivalents of the appended claims.

What is claimed is:

1. In a furnace for producing molten glass and including a tank holding the molten glass and having walls composed of refractory bricks which define the upper edge of such walls and in contact with the molten glass, the furnace further including upper side walls of refractory material spaced above the tank walls and laterally offset from the tank walls toward the exterior of the furnace, the upper side walls being in contact with the atmosphere above the molten glass and liquid products forming above the bath flowing down such upper side walls to the lower edge thereof disposed above the refractory bricks and then falling toward the upper surface of the bricks, the improvement comprising a device for protecting said bricks from corrosion by such liquid products, said device including a removable liquid collecting structure positioned beneath the lower edge of said side walls in the free fall path of the liquid products for collecting such products and dimensioned for ready placement and removal via the space existing between the upper surface of said bricks and the lower edge of said side walls.

2. The device as defined in claim 1 wherein said removable structure includes a hollow metal box, an inlet pipe and an outlet pipe for circulating a refrigerant through said hollow metal box.

3. The device as defined in claim 2 and further including side walls mounted on said hollow metal box and removable therefrom, said side walls being formed of different elements each of which comprises a heat resistant material.

4. The device as defined in claim 3 wherein one of said side walls is a block positioned between said metal box and the lower horizontal face of the side wall of the furnace.

5. The device as defined in claim 3 wherein one of said side walls for said metal box is of metal and in the shape of an angle iron having a horizontal flange arranged on said metal box and a vertical flange positioned against the inner face of the tank wall of the furnace.

6. The device as defined in claim 5 wherein said vertical flange is immersed in the molten glass.

7. The device as defined in claim 6 wherein said metal box is provided with an upstanding projection thereon and said horizontal flange is provided with a recess for receiving said projection therein for securing said flange to said metal box.

References Cited

UNITED STATES PATENTS 2,263,848  11/1941  Keaney.
2,694,272  11/1954  Spengler _____ 65—27 X DONALL H. SYLVESTER, Primary Examiner.

ARTHUR D. KELLOGG, Assistant Examiner.

U.S. Cl. X.R.

65—27, 172, 347, 374